Figure 5:
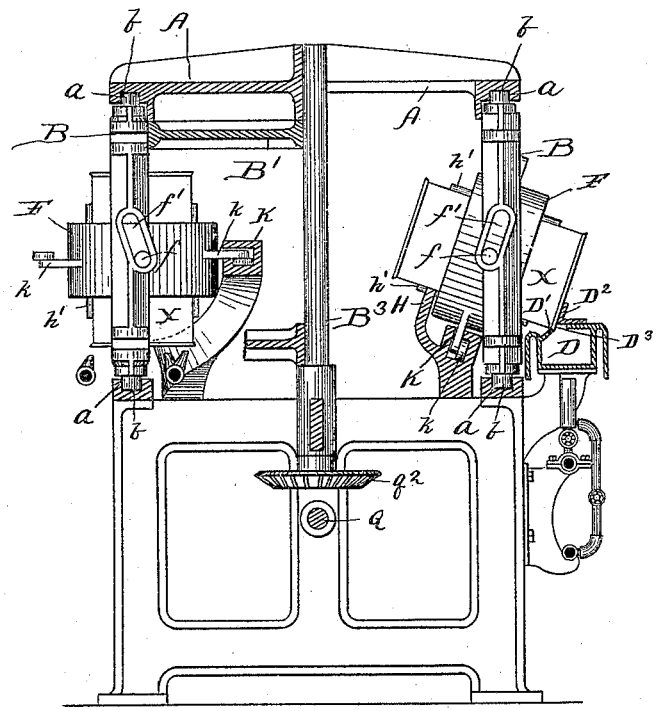

(No Model.) 2 Sheets—Sheet 1.
J. G. HODGSON.
CAN SOLDERING MACHINE.
No. 446,454. Patented Feb. 17, 1891.
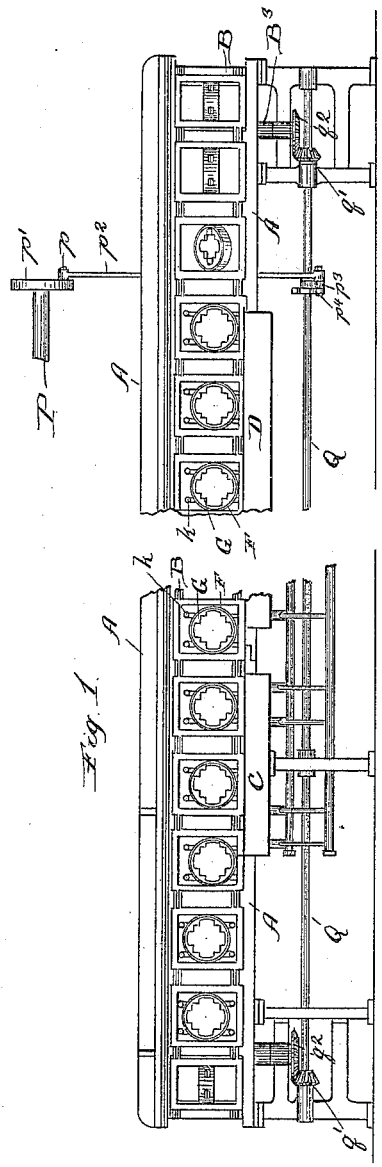
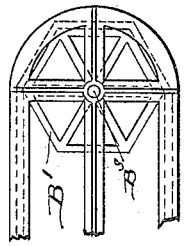
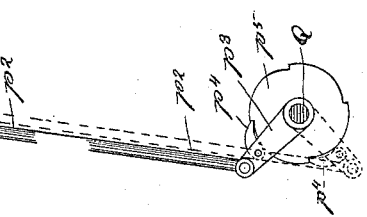
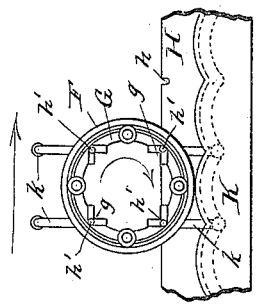
Witnesses:
Geo. C. Curtis
H. W. Munday
Inventor:
John G. Hodgson
By Munday, Evarts & Adcock
His Attorneys.

(No Model.) 2 Sheets—Sheet 2.

J. G. HODGSON.
CAN SOLDERING MACHINE.

No. 446,454. Patented Feb. 17, 1891.

UNITED STATES PATENT OFFICE.

JOHN G. HODGSON, OF MAYWOOD, ILLINOIS, ASSIGNOR TO EDWIN NORTON, OF SAME PLACE, AND OLIVER W. NORTON, OF CHICAGO, ILLINOIS.

CAN-SOLDERING MACHINE.

SPECIFICATION forming part of Letters Patent No. 446,454, dated February 17, 1891.

Application filed October 2, 1890. Serial No. 366,799. (No model.)

*To all whom it may concern:*

Be it known that I, JOHN G. HODGSON, a citizen of the United States, residing in Maywood, in the county of Cook and State of Illinois, have invented a new and useful Improvement in Can-Soldering Machines, of which the following is a specification.

My invention relates to improvements in machines for soldering the joints or seams of square, rectangular, or other cans having flat or irregular sides, and more particularly to improvements upon the machine shown and described in Letters Patent No. 354,731, of December 21, 1886.

I have discovered in the practical operation of the square-can-soldering machine shown and described in said Letters Patent No. 354,731 that when a square or rectangular can is rolled through the bath of flux and solder sometimes imperfect work is done by reason of the solder not having time to sweat or flow through the joint or seam while the straight or flat edge of the can is immersed in the solder during the rolling operation of the can; and I have discovered that this difficulty in soldering square or rectangular cans by a rolling operation may be overcome by giving the can-carrier an intermittent motion, so that each can will momentarily pause while each of its sides or seams is immersed in the solder bath; and my improvement upon said patented machine consists, in connection with the other parts, of an intermittently-moving can-carrier, and also in the means or mechanism I employ to impart to the carrier the required intermittent movement.

In the accompanying drawings, which form a part of this specification, and in which similar letters of reference indicate like parts, Figure 1 is a side elevation of a machine embodying my invention. Fig. 2 is a detail view of the mechanism employed for imparting an intermittent movement to the carrier. Fig. 3 is a plan view of the carrier and one of its sprocket-wheels or pulleys around which it travels. Fig. 4 is a side elevation showing the track for turning the can-holders and giving them an up-and-down movement as they are moved forward by the carrier, and Fig. 5 is an enlarged cross-sectional view of the machine.

In the drawings, A represents the frame of the machine; B, the can-carrier; B', the pulleys or wheels upon which the carrier travels; C, the flux bath, and D the bath of molten solder. The carrier B is preferably a link-chain carrier, and travels in suitable guideways or tracks $a$ on the frame. The links of the carrier are provided with friction rollers or pins $b$, which travel in the guide grooves or tracks $a$ $a$.

F is a swiveling or pivotal ring having pivot-pins $ff$, which fit in slots $f'$ $f'$ in the vertical sides of the link B, so that this ring may have an up-and-down reciprocating movement in the slots.

G is the can-holder ring, mounted in ring F and furnished with a socket $g$ for the can, conforming in shape thereto. The carrier B has an intermittent forward movement, pausing momentarily while each seam or corner edge of the can is immersed in the solder or flux baths. The can-holder ring G revolves in the pivotal ring F. By this means it will be observed that the can X in the socket $g$ will have an intermittently rolling movement in and through the solder bath, pausing momentarily as each seam or joint of the can is immersed in the solder bath. The can-carrier B gives an intermittent forward movement to the can, while the can-holder ring G, revolving in the ring F, gives a turning or rolling movement to the can, and at the same time the ring F, by reason of the pins $f$ and slots $f'$, affords an up-and-down movement to the can to adapt it to turn or revolve on its axis. The pivots $f$ also permit the can to be turned into an upright position while the solder is setting.

H is the track, provided with notches or recesses $h$ $h$ at intervals corresponding to the side faces or corners of the cans, and which receive and engage corresponding pins or projections $h'$ $h'$ on the revolving can-holder ring G to give the rolling or revolving movement to the can as it is carried forward by the carrier.

K is the cam-track, along which travels an arm or projection $k$, secured to the swinging or pivotal ring F, whereby the can is given a bodily up-and-down movement. The intermittent movement is imparted to the carrier from the driving-shaft P by means of a wrist-pin $p$ on the wheel $p'$, link $p^2$, crank-arm $p^3$, furnished with a pawl $p^4$, which engages a ratchet $p^5$ on the shaft Q. The shaft Q is furnished with a bevel-gear $q'$, which meshes with a bevel-gear $q^2$ on the shaft B of the chain-wheel B'. By this means an intermittent forward motion is imparted to the carrier as the can-holder is rolled or revolved by the projection $h'$ engaging the notches $h$ on the track H. As the carrier moves forward a like intermission is produced in the revolving or rolling motion of the can-holder and the can therein, so that each seam or joint to be soldered will be caused to momentarily pause as and while it is immersed in the solder bath or vessel. The solder bath is provided with the usual gage or track $D'$ $D^2$ for the can to rest against, there being a slot $D^3$ between the gages for the seam or joint of the can to project through into the molten solder.

As my improvement consists solely in giving this intermittent motion to the carrier, and as the general construction and operation of this machine is well known to those skilled in the art and fully shown and described in said Letters Patent No. 354,731 before referred to, it is not deemed necessary to herein more fully show and describe the other parts or features of said machine. For more full description of the remaining portions of the machine reference is hereby made to said Patent No. 354,731.

The number of teeth on the ratchet $p^5$ ordinarily should correspond to the number of sides of the can to be soldered, though, of course, when the can is square and its sides equal, as indicated in the drawings, it is a matter of indifference what the number of teeth on the ratchet are. The movement given by each tooth of the ratchet turns the can over one of its corners to bring its succeeding side or seam into the molten solder.

I claim—

1. In a machine for soldering angular or irregular-shaped cans, the combination, with a solder bath, of an intermittently-moving can-carrier and a revolving up-and-down bodily-reciprocating can-holder mounted on said carrier for rolling the can through said bath, substantially as specified.

2. In a machine for soldering angular or irregular-shaped cans, the combination, with a solder bath, of an intermittently-moving can-carrier and a revolving up-and-down bodily-reciprocating can-holder mounted on said carrier for rolling the can through said bath, and a stationary cam or track engaging said can-holder for giving it its up-and-down bodily-reciprocating movement, substantially as specified.

3. In a machine for soldering angular or irregular-shaped cans, the combination of a solder bath with an intermittently-moving can-carrier, a series of revolving can-holders mounted thereon, and a stationary track engaging said can-holders for giving the can its rolling or revolving movement, substantially as specified.

4. In a machine for soldering angular or irregular-shaped cans, the combination of a solder bath with an intermittently-moving can-carrier and a series of inclined revolving pivotal up-and-down reciprocating can-holders mounted on said carrier for rolling the cans through said bath, and a stationary cam or track engaging said can-holders for giving them their up-and-down bodily-reciprocating movement, substantially as specified.

5. In a machine for soldering angular or irregular-shaped cans, the combination, with a solder bath, of an intermittingly-moving can-carrier, revolving up-and-down bodily-reciprocating can-holders mounted on said carrier, and a cam or track for revolving said can on its axis intermittently as the carrier is intermittently moved forward, and a second cam or track engaging said can-holder for giving said can-holder its up-and-down reciprocating movement as it rolls through said bath, substantially as specified.

6. The combination, with a solder bath, of an intermittently-moving can-carrier, an inclined up-and-down can-holder mounted on said carrier for equally immersing the seam of an angular or irregular-shaped can in said bath as the can revolves, a cam or device engaging said can-holder for reciprocating the same up and down as it revolves, and mechanism for imparting an intermittent movement to said carrier, substantially as specified.

7. In a machine for soldering angular or irregular-shaped cans, the combination, with a solder bath, of an intermittently-moving can-carrier and a revolving up-and-down bodily-reciprocating can-holder mounted on said carrier for rolling the can through said bath, and mechanism for imparting an intermittent movement to said carrier, substantially as specified.

8. In a machine for soldering angular or irregular-shaped cans, the combination, with a solder bath, of an intermittently-moving can-carrier and a revolving up-and-down bodily-reciprocating can-holder mounted on said carrier for rolling the can through said bath, and a stationary cam or track engaging said can-holder for giving it its up-and-down bodily-reciprocating movement, and mechanism for imparting an intermittent movement to said carrier, substantially as specified.

JOHN G. HODGSON.

Witnesses:
H. M. MUNDAY,
EMMA HACK.